W. L. C. KOCH.
CAR FENDER.
APPLICATION FILED NOV. 29, 1911.

1,021,413.

Patented Mar. 26, 1912.
2 SHEETS—SHEET 1.

Witnesses:

Inventor:
W. L. C. Koch

W. L. C. KOCH.
CAR FENDER.
APPLICATION FILED NOV. 29, 1911.
1,021,413.
Patented Mar. 26, 1912.
2 SHEETS—SHEET 2.
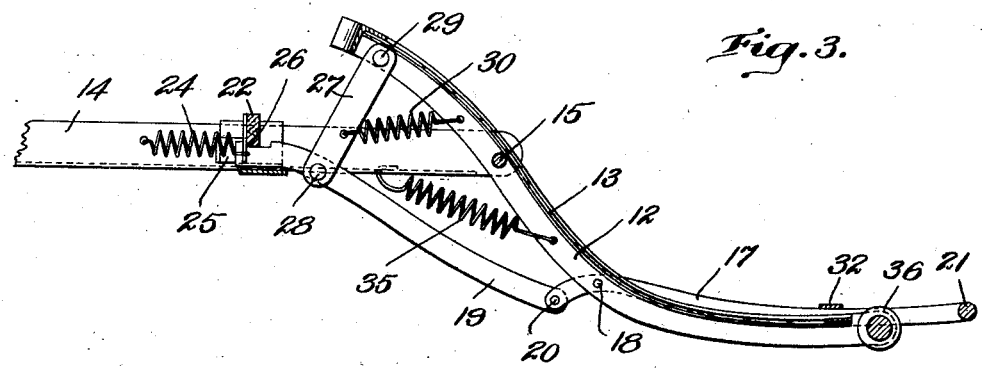
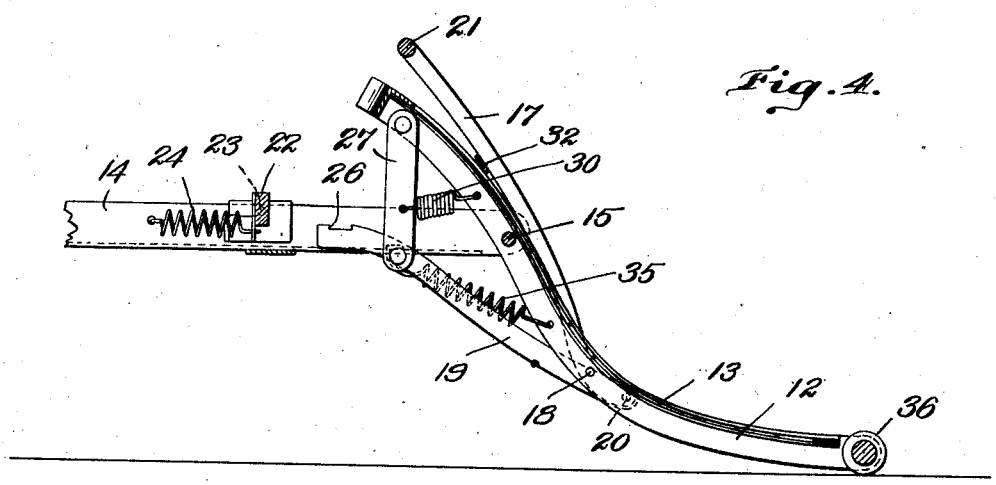
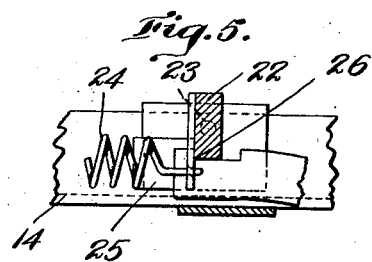
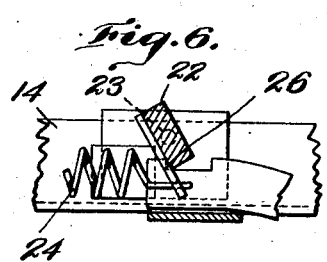
Witnesses:
Inventor:
W. L. C. Koch

UNITED STATES PATENT OFFICE.

WILLIAM L. C. KOCH, OF DEDHAM, MASSACHUSETTS.

CAR-FENDER.

1,021,413.	Specification of Letters Patent.	Patented Mar. 26, 1912.

Application filed November 29, 1911. Serial No. 663,097.

*To all whom it may concern:*

Be it known that I, WILLIAM L. C. KOCH, a citizen of the United States, and a resident of Dedham, in the county of Norfolk and State of Massachusetts, have invented certain new and useful Improvements in Car-Fenders, of which the following is a specification.

This invention relates to fenders for street cars, the fender including a shelf-like fender body located at the forward end of the car, and adapted in moving forward with the car to pick up or receive upon its upper surface a person either lying on the track or falling in front of the car, means being provided for normally supporting the front end of the fender body at a sufficient height above the track to prevent contact therewith, and for quickly dropping the same to the track in case of accident.

The invention has for its object to provide improved mechanism for securely supporting the fender body in its normal running position and for insuring its quick automatic release by an obstruction on the track and the quick depression of its front end to a position to pick up the obstruction, the construction being such that the fender body is adapted to be quickly folded out of the way against the front of the car and to be quickly and conveniently adjusted to its normal position in readiness for action.

The invention consists in the improvements which I will now proceed to describe and claim.

Figure 1:
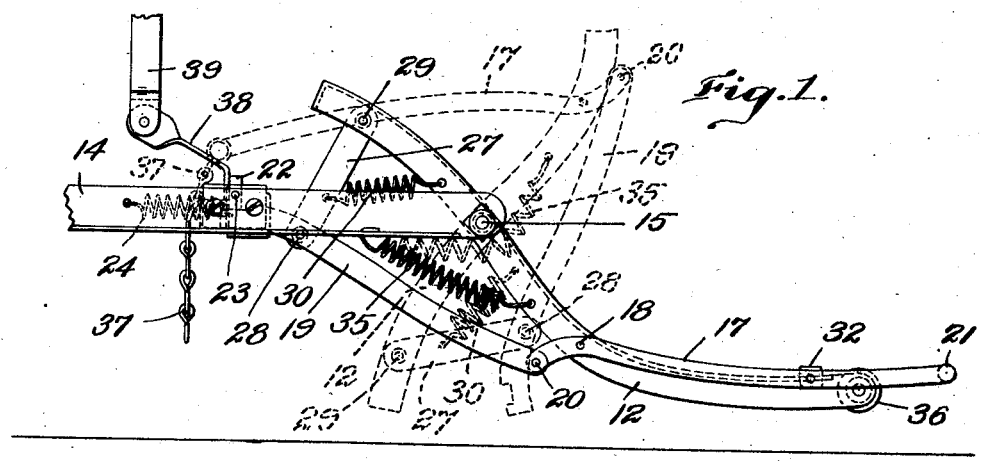
Figure 2:
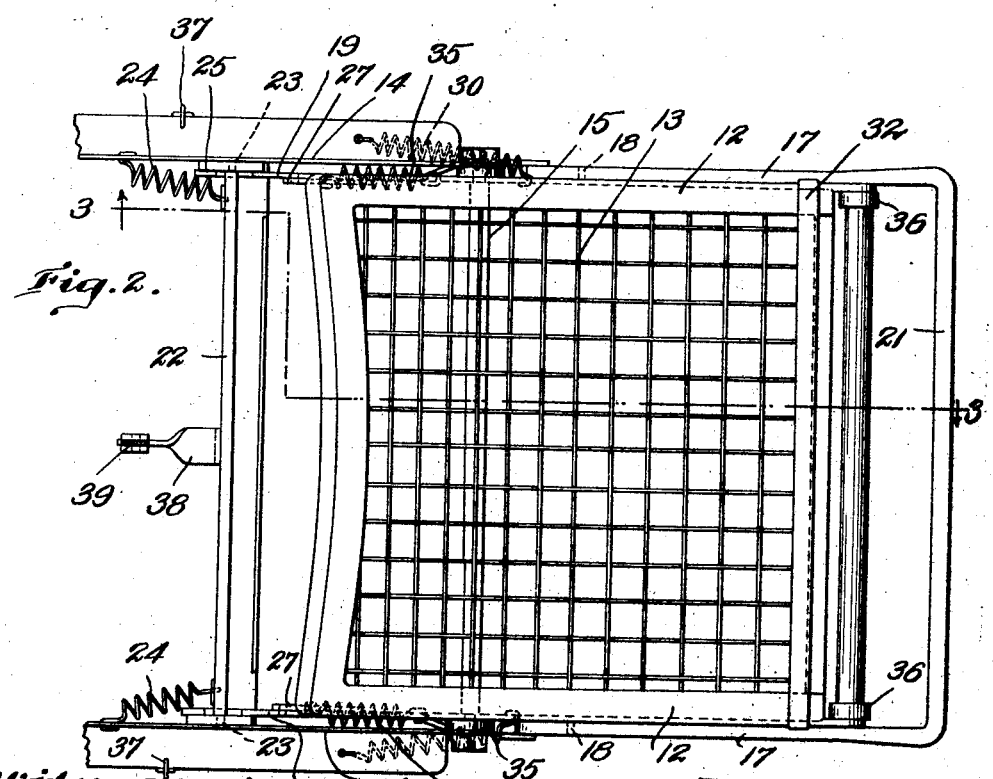

Of the accompanying drawings which form a part of this specification:—Figure 1 represents a side elevation of a car fender embodying my invention; said figure showing by dotted lines the position of the movable parts when the fender is folded; Fig. 2 represents a top plan view of the same; Fig. 3 represents a section on line 3—3 of Fig. 2; Fig. 4 represents a view similar to Fig. 3, showing the fender body dropped to pick up an obstruction; Fig. 5 represents an enlargement of a portion of Fig. 3; Fig. 6 represents a view similar to Fig. 5, illustrating the release of the fender body supporting mechanism.

Similar reference characters indicate the same parts in all the figures.

In the drawings:—12 represents a fender body which is preferably an open frame having a suitable, yielding filling 13, such as a sheet of wire netting. The fender body 12 is hinged to a car in such manner that its forward end is adapted to be elevated above the track, as shown by Figs. 1 and 3, or lowered to the track, as shown by Fig. 4. In this embodiment of the invention, the hinges which connect the fender body with the car, are provided by fixed arms 14 attached rigidly to the car and a horizontal rod 15 passing through holes in said arms and in the fender body, the latter being adapted to swing on said rod. The fender body is preferably curved, as shown by Figs. 1, 3 and 4, and when held in its normal position, shown by Figs. 1 and 3, by the mechanism hereinafter described, its forward end is relatively near the track and is at such height that it will not collide with the track when partaking of vertical swaying movements of the car, the rear end being considerably higher than the forward end and located above the level of the hinges.

To support the fender body in its normal position and cause its forward end to drop quickly upon the track and pick up an obstruction, I provide mechanism which includes a pair of jointed supports or knuckles pivoted to the longitudinal edges of the fender body, and each composed of a lever 17 pivoted or fulcrumed at 18 to the fender body, and having a forwardly projecting longer arm, and a rearwardly projecting shorter arm, and a link 19 pivoted at 20 to the shorter arm. The forward ends of the longer arms of the levers 17 are connected by a transverse feeler bar 21 which extends across the fender body in advance of its forward end. The levers 17 and feeler bar 21 are preferably made from a single metal rod or bar bent and formed as indicated by Figs. 1 and 2. The said mechanism also includes a transverse stop or detent bar 22, having trunnions 23 at its ends, which are journaled in bearings in the arms 14, the bar 22 being normally held by springs 24 against fixed abutments 25 in the position shown by Fig. 5, so that its lower edge is adapted to swing forward from said abutments, as shown by Fig. 6. The end portions of the lower edge of the bar 22 constitute stops adapted to engage the rear ends of the links 19, and positively hold said links against upward movement from the position shown by Fig. 3. The links are provided with shoulders 26 which engage the rear side of the bar 22 when the fender is in its normal position, so that 'the stop portions of the bar act to yieldingly confine the links against forward endwise movement.

The links 19 are connected with the fender body by arms 27 pivoted at 28 to the links and at 29 to the rear end portion of the body. Said arms are connected with the fender body at points behind the hinge rod 15 by springs 30 which act through the arms 27 on the links 19 to press the link shoulders 26 outwardly against the stop bar 22, and to move the links endwise to the positions shown by Fig. 4, when they are disengaged from the stop bar, said springs acting in the opposite direction from the springs 24. The pull of the springs 24 tending to maintain the stop bar in its operative position (Fig. 5) is greater than the pull of the springs 30 in the opposite direction on the links 19, so that the stop bar is normally held in position to lock the fender body in its normal position (Fig. 3).

The levers 17 and links 19 are so formed and relatively arranged that when the parts are adjusted, as shown by Fig. 3, they coöperate with the stop bar 22 in locking the fender body with its forward end raised, the shorter arms of the levers 17 being inclined downwardly so that the joints connecting them with the links 19 cannot be flexed upwardly. The levers 17 are prevented from swinging downwardly by a cross piece 32 attached to their forward end portions and bearing removably on the upper side of the fender body. The effect of the levers and links when the links are engaged with the stop bar 22, is therefore the same as it would be if they were rigidly connected instead of being jointed, the links being held rigidly by the stop bar 22, and the fender body being held rigidly by the conjoint action of the stop bar, the links, the arms 27, and the levers 22.

In case a human body is lying on the track before the advancing car, the fender being adjusted as shown by Fig. 3, the feeler bar 21, which is supported at such height as to strike the upper portion of the prostrate body, is raised with the longer arms of the levers 17, by contact with said body, the shorter arms of the levers being correspondingly lowered and caused to exert a forward pull on the links 19. This pull, aided by the constant pull of the springs 30, is sufficient to overcome the force of the springs 24 and cause the links 19 to move forward and displace the stop bar 22, as indicated by Fig. 6, the forward movement of the links continuing until they are entirely disengaged from the stop bar. The fender body is now released and its forward end is depressed suddenly by gravitation and by the springs 35 hereinafter described, to the track, the longer arms of the levers 17 and the feeler bar being at the same time thrown upwardly, as shown by Fig. 4, by the springs 30 acting through the arms 27 and links 19. The springs 35 are connected with the fixed bars 14 behind the hinge rod 15, and with the fender body in front of the hinge rod, and exert a constant downward pull on the forward end portion of the fender body. When the forward end of the fender body is depressed, it is adapted to pick up the body on the track and transfer the same to the upper side of the fender body which is now unobstructed, the feeler bar having been thrown upwardly, as above stated. The forward end of the fender body is preferably provided with small rolls 36 adapted to run on the track.

As indicated by Fig. 4, the entire mechanism above described, excepting the stop bar 22 and its springs, is carried by the fender body, so that the fender body and the parts carried thereby may be turned upwardly against the front end of the car, and confined by the engagement of short chains 37 with the longer arms of the levers 17, as indicated by dotted lines in Fig. 1.

The stop bar 22 may be displaced to release the fender body by the motor-man on the car through an inclined lever 38 attached to the central part of the bar and hinged to a plunger 39 vertically movable through the floor of the car vestibule and adapted to be depressed by the motor-man's foot. The springs 24 returning the stop bar to its normal position, raise the lever 38 and plunger 39 after the depressing pressure is removed.

I claim:—

1. A car fender comprising a fender body hinged to the car, a feeler bar carried by the fender body in advance of its forward end, yieldingly maintained displaceable stops carried by the car behind the fender body and mechanism intermediate the feeler bar and stops and carried by the fender, adapted to coöperate with the stops in locking the fender in its normal position, and to coöperate with the feeler bar in displacing the stops and releasing the fender body when the feeler bar is raised.

2. A car fender comprising a fender body hinged to the car, yieldingly maintained displaceable stops carried by the car behind the fender body, a feeler bar extending crosswise of the fender body in advance of its forward end, and supporting knuckles composed of levers carrying the feeler bar and fulcrumed on the fender body, said levers having longer and shorter arms, and links pivoted to the said shorter arms and adapted to engage the stops, the links being movable endwise and caused to exert displacing pressure on the stops by an upward movement of the feeler bar.

3. A car fender comprising a fender body hinged to the car, pivoted stops carried by the car behind the fender body, rearwardly pulling springs connected with said stops, a feeler bar extending crosswise of the fender body in advance of its forward end, supporting knuckles composed of levers fulcrumed on the fender body and carrying the feeler bar, links pivoted to the levers and adapted to engage the stops, the links being movable endwise and caused to exert displacing pressure on the stops by an upward movement of the feeler bar, and means for exerting a forward pull on the links in opposition to the rearward pull on the stops.

4. A car fender comprising a fender body hinged to the car, pivoted stops carried by the car behind the fender body, rearwardly pulling springs connected with said stops, a feeler bar extending crosswise of the fender body in advance of its forward end, supporting knuckles composed of levers fulcrumed on the fender body and carrying the feeler bar, links pivoted to the levers and adapted to engage the stops, the links being movable endwise and caused to exert displacing pressure on the stops by an upward movement of the feeler bar, arms pivoted to the links and to the rear end portion of the fender body, and springs connecting said arms with the fender body and adapted to exert a forward pull, through the arms, on the links in opposition to the rearward pull on the stops.

5. A car fender comprising a fender body hinged to the car, a feeler bar carried by the fender body in advance of its forward end, a stop bar pivoted to the car behind the fender body, means for yieldingly maintaining the stop bar in its operative position and permitting its forward displacement therefrom, mechanism carried by the fender body, intermediate the feeler bar and the stop bar, adapted to coöperate with the stop bar in locking the fender body in its normal position, and with the feeler bar in displacing the stop bar to release the fender body when the feeler bar is raised, and means operable by an attendant for displacing the stop bar.

6. A car fender comprising a fender body hinged to the car, a feeler bar carried by the fender body in advance of its forward end, yieldingly maintained displaceable stops carried by the car behind the fender body, mechanism intermediate the feeler bar and stops and carried by the fender, adapted to coöperate with the stops in locking the fender in its normal position, and to coöperate with the feeler bar in displacing the stops and releasing the fender body when the feeler bar is raised, and springs connected with the car and with the fender body exerting a downward pull on the forward portion of the fender body.

7. A car fender comprising a fender body hinged to the car, a feeler bar extending crosswise of the fender body in advance of its forward end, supporting knuckles composed of levers carrying the feeler bar and fulcrumed on the fender body, and links pivoted to said levers and extending rearwardly therefrom, and displaceable locking means carried by the car behind the fender body, and engaging the links for normally locking said knuckles in position to hold the forward end of the fender body in a raised position, said means being rendered inoperative by an upward movement of the feeler bar.

8. A car fender comprising a fender body hinged to the car, a feeler bar extending crosswise of the fender body in advance of its forward end, supporting knuckles composed of levers carrying the feeler bar and fulcrumed on the fender body, and links pivoted to said levers and extending rearwardly therefrom, means for exerting a yielding forward pull on said links, and displaceable locking means carried by the car behind the fender body for engaging the links to yieldingly resist forward movement of the links and lock the knuckles, said locking means being rendered inoperative by an upward movement of the feeler bar.

9. A car fender comprising a fender body hinged to the car, a feeler bar extending crosswise of the fender body in advance of its forward end, supporting knuckles composed of levers fulcrumed on the car and carrying the feeler bar and links pivoted to the levers and extending rearwardly therefrom, displaceable means carried by the car behind the fender body for normally locking the knuckles, the fender body being adapted to be folded to a vertical position and the levers and feeler bar being adapted to project inwardly from the upper end of the folded fender body, and means for securing the levers and feeler bar to hold the fender in its folded position.

In testimony whereof I have affixed my signature, in presence of two witnesses.

WILLIAM L. C. KOCH.

Witnesses:
C. F. BROWN,
A. H. BROWN.